# United States Patent [19]

Shafer

[11] 3,792,835
[45] Feb. 19, 1974

[54] TRUNNION TYPE ROTARY VALVE OF WELDED TUBE AND PLATE CONSTRUCTION

[76] Inventor: Homer J. Shafer, 2300 Park Ave. West, Mansfield, Ohio 44906

[22] Filed: June 8, 1972

[21] Appl. No.: 260,898

[52] U.S. Cl. ............................................. 251/309
[51] Int. Cl. ............................................. F16k 5/02
[58] Field of Search ... 251/309, 310, 311, 312, 313, 251/314, 315, 367

[56] References Cited
UNITED STATES PATENTS

| | | | |
|---|---|---|---|
| 3,580,268 | 5/1971 | Shafer | 251/315 X |
| 3,195,857 | 7/1965 | Shafer | 251/309 |
| 3,460,803 | 8/1969 | Scaramucci | 251/315 X |
| 3,463,450 | 8/1969 | Works | 251/309 |
| 3,484,079 | 12/1969 | Reagan | 251/309 |
| 3,545,721 | 12/1970 | Shafer | 251/309 |
| 3,599,933 | 8/1971 | Piccardo | 251/309 |

Primary Examiner—Samuel Scott
Attorney, Agent, or Firm—Hamilton, Renner & Kenner

[57] ABSTRACT

A rotary ball valve element for a valve housing with interior spherical seating surfaces and trunnion bearings. The valve element has a central preformed flow tube with diametrically opposed sealing plates and trunnion plates rectangularly arranged around the tube in tangential abutment therewith and welded together at the corners. Reinforcing plates extend lengthwise of the exterior of the tube and angularly across the corners of the sealing plates and trunnion plates and are welded to the inner surfaces thereof. The exterior surfaces of the plate edges are spherical to conform to the interior seating surfaces of the housing. The trunnions comprise bosses integral with the trunnion plates and having a relatively small axial thickness and a relatively large diameter.

6 Claims, 8 Drawing Figures

TRUNNION TYPE ROTARY VALVE OF WELDED TUBE AND PLATE CONSTRUCTION

BACKGROUND OF THE INVENTION

Important advantages of a ball valve having a valve element formed of a tube and plates welded together in a rectangular arrangement around the tube as compared with a forged or cast ball are set forth in my U.S. Pat. No. 3,323,537, issued June 6, 1967. The advantages include the minimal amount of machining required of spherical surfaces and a substantial reduction in material as compared to that required in a cast or forged ball. However, the ball valve element of said U.S. Pat. No. 3,323,537 required four large arcuate ribs extending between the sealing plates and welded to the tube and to the sides of the trunnion plates, as well as four corner reinforcing plates welded in the interior corners between the sealing plates and trunnion plates, in order to provide sufficient strength to resist high pressures with minimal distortion when the valve is closed. The trunnions disclosed in said patent are quite small in diameter and do not add any material amount of strength in resisting high pressures on the valve element.

SUMMARY OF THE INVENTION

It is an object of the present invention to provide an improved rotary valve in which the valve element is formed of a central tube having plates rectangularly arranged around the tube and welded together in such manner as to require a minimum amount of machined spherical surfaces.

Another object is to provide a valve element having a reinforced tube and plate structure which has an improved strength to weight ratio.

A further object is to provide an improved valve element structure having trunnion plates with enlarged flattened trunnions thereon designed to resist high line pressures when the valve element is in closed position.

Another object is to provide an improved valve element structure having rectangularly arranged trunnion plates and sealing plates welded together at their edges and surrounding a central tube, with corner reinforcing plates constructed and arranged to transmit high pressure thrust on the sealing plates in directions to be resisted by the combined strength of the trunnion plates and trunnions.

DESCRIPTION OF THE PREFERRED EMBODIMENT

Figure 1:
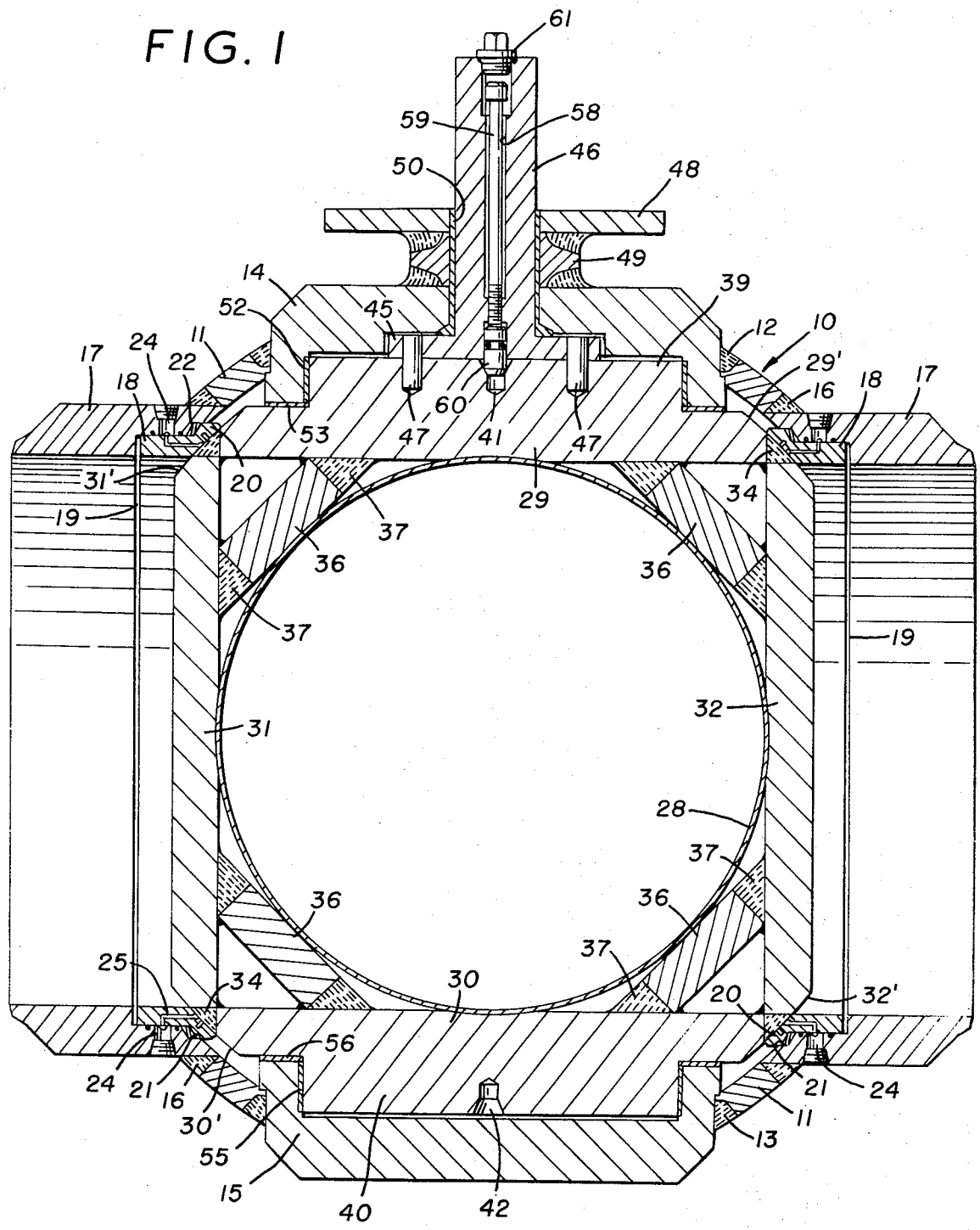
FIG. 1 is a vertical sectional view on the axis of the flow tubes of a preferred embodiment of valve housing, showing the improved rotary valve element in closed position.
Figure 2:
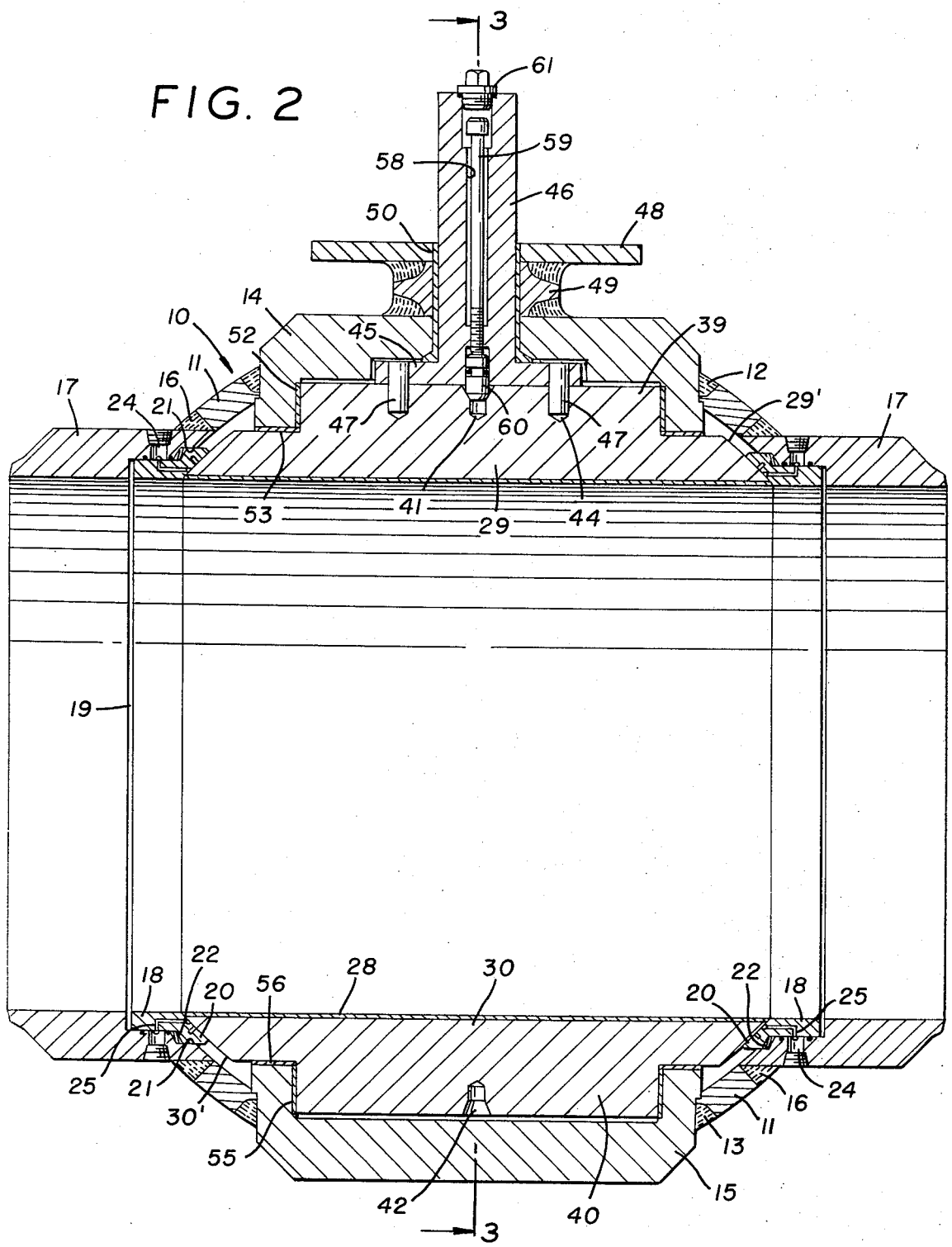
FIG. 2 is a similar view showing the valve element in open position.
Figure 3:
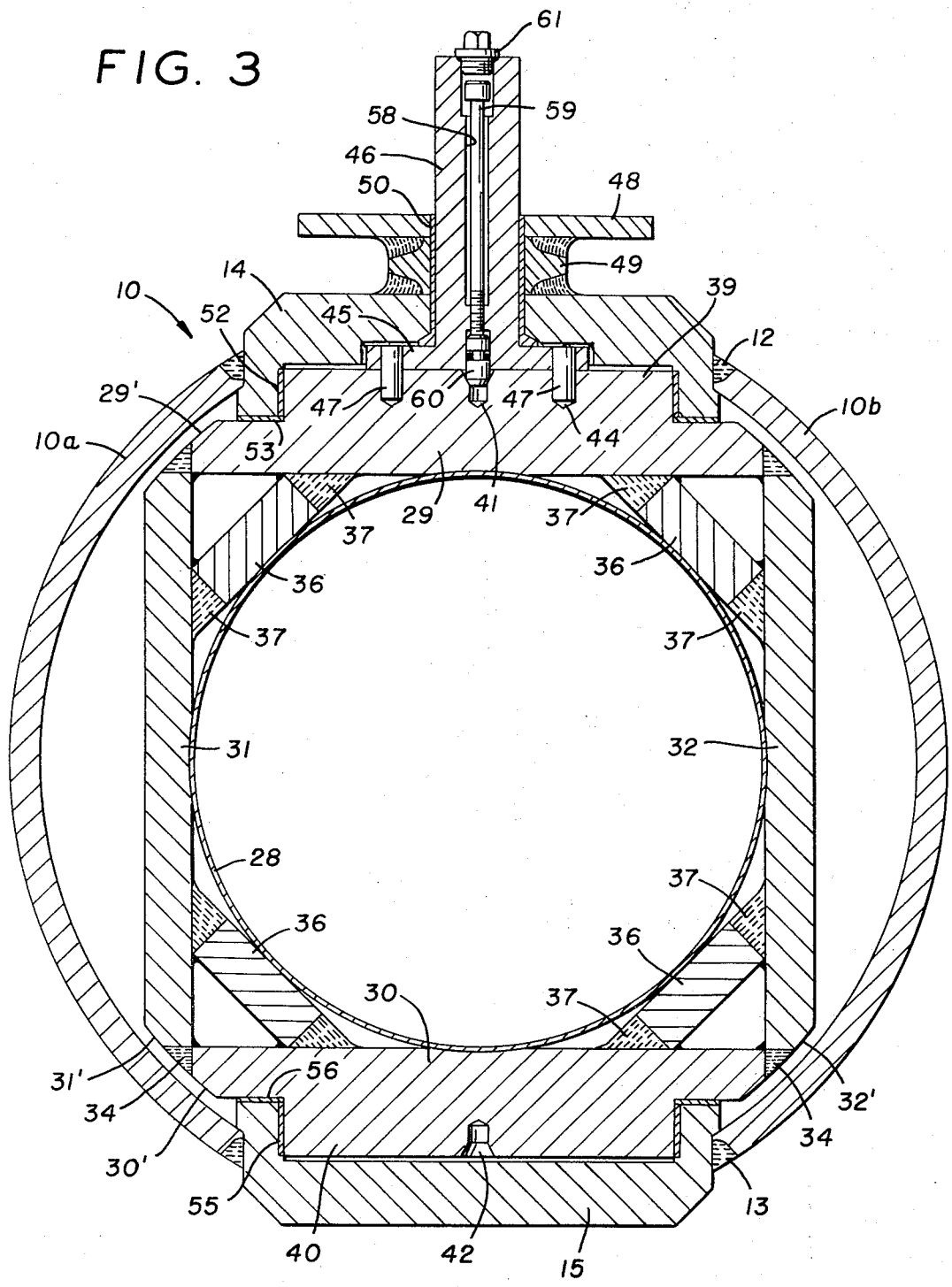
FIG. 3 is a vertical sectional view on line 3—3 of FIG. 2.

The preferred embodiment of valve body or housing, in which the improved rotary valve element is rotatably mounted, as shown generally at 10 in FIGS. 1, 2 and 3, is constructed of two curved mating halves 10a and 10b which are welded together in a vertical plane passing through the stem axis and the flow axis. The welded joint between the two parts is shown at 11 in FIGS. 1 and 2. The weldment 11 connects with circular weldments 12 and 13 between the body and the trunnion bearings 14 and 15 at the top and bottom of the body, and also connects with circular welds 16 which connect the flow tubes 17 to the open ends of the body. The method of forming the valve body is fully disclosed in my prior U.S. Pat. No. 3,545,721 and per se forms no part of the present invention.

The flow tubes 17 have interior annular recesses formed at their inner ends for receiving seating rings 18 which abut spherical surfaces on the valve element, and these seating rings are inserted in place before the flow tubes 17 are joined by welding to the body. As shown, the inner ends of the seating rings 18 have spherical surfaces thereon and have annular shoulders 20 extending radially outward. The shoulders 20 fit slidably in annular grooves 21 in the flow tubes and are backed up by annular spring washers 22 which yieldingly urge the seating rings against the valve element. As shown, a slight clearance 19 is provided between the outer end of the seating rings 18 and the annular recesses therefor in flow tubes 17 to allow for the yielding movement of the rings.

The flow tubes are preferably provided with lubricant seal means to supply lubricant to the spherical sealing surfaces at their inner ends. Thus, lubricant supply ports 24 extend radially inward through the flow tubes to the outer surface of the seating rings therein and O-rings surround the inner ends of the ports at the seating ring surface. From the inner ends of the ports L-shaped passageways 25 in the seating rings extend to the spherical surfaces at the inner ends of the seating rings.

The novel and improved rotary valve element is shown removed from the valve body in FIGS. 4 – 7, and comprises a central flow tube 28 with four circular plates rectangularly arranged in tangential abutment therewith. The tube 28 is a piece of pipe or tubing having a length to fit within and in alignment with the flow tubes of the assembled body, as shown in FIG. 2, when the valve element is in open position, the inner diameter of tube 28 being identical to the inner diameter of the flow tubes 17 and rings 18 of the body.

The four plates surrounding the tube 28 comprise two diametrically opposite upper and lower circular trunnion plates 29 and 30 which are mounted substantially tangentially abutting the tube, and two diametrically opposite circular sealing plates 31 and 32 at right angles to the plates 29 and 30 and substantially tangentially abutting the tube 28. As shown, the plates 29, 30, 31 and 32 are preferably slightly concaved at their central portions to conform to the curvature of the tube. The diameters of the four plates are equal to the length of tube 28, and the outer peripheries of all the plates are formed as spherical surfaces 29', 30', 31' and 32', respectively, about the center of the tube 28 which center is adapted to coincide with the center of the valve body when the valve element is rotatably mounted therein, as shown in FIGS. 1 – 3.

When the four plates are rectangularly arranged around the tube 28 in substantial tangential abutment therewith, arcuate segments of the outer peripheries of the plates intersect each other and are replaced by weldments indicated at 34 securing the plates together. As best shown in FIG. 1, the weldments 34 are substantially triangular in cross section and have their outer surfaces faced off to conform to the spherical peripheral surfaces of the adjoining plates. Thus, the peripheral surfaces of the four plates together with the conforming spherical surfaces of the weldments 34 provide outer spherical surfaces on the valve element, making it the equivalent of a ball valve having its center coinciding with the center of tube 28.

Figure 4:
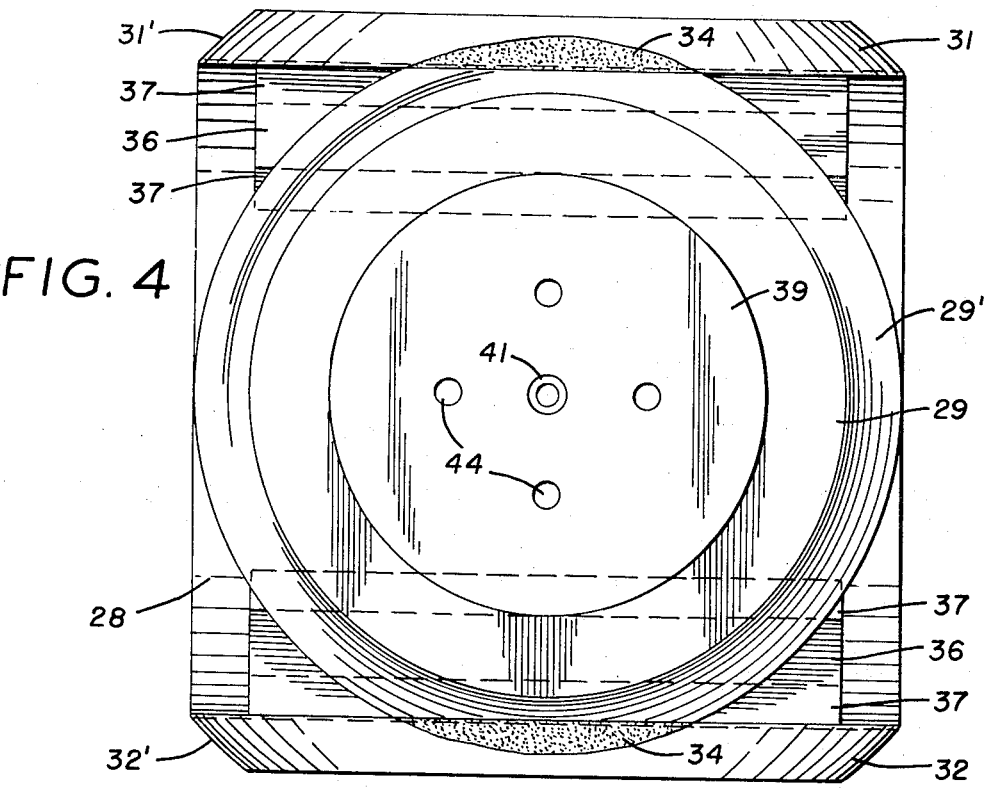
FIG. 4 is a top plan view of the improved rotary valve element removed from the housing.
Figure 5:
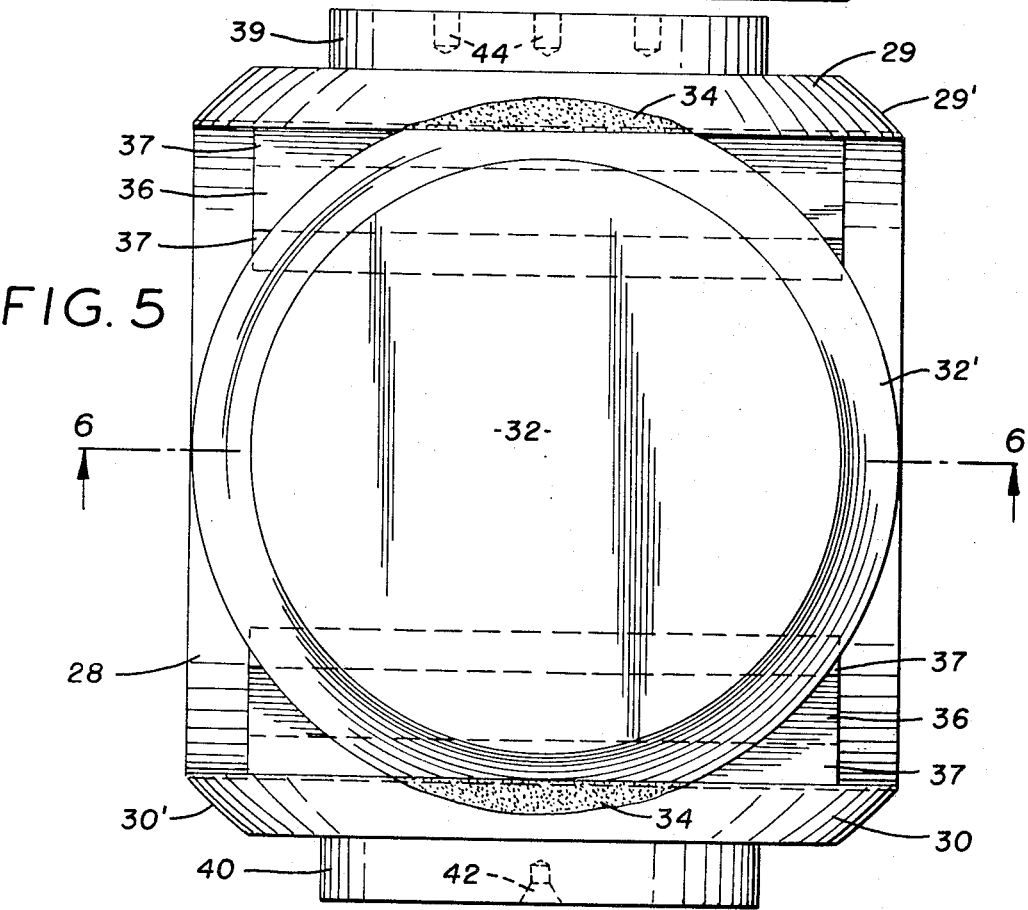
FIG. 5 is a side elevation thereof.
Figure 6:
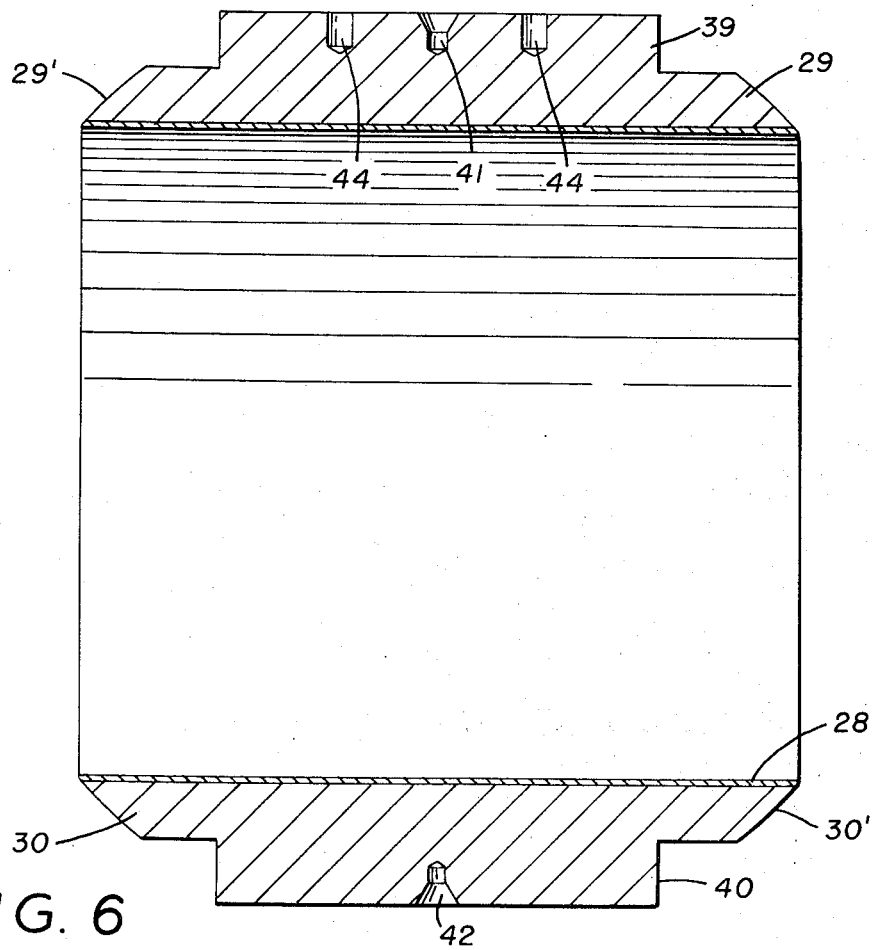
FIG. 6 is a sectional view on line 6—6 of FIG. 5.
Figure 7:
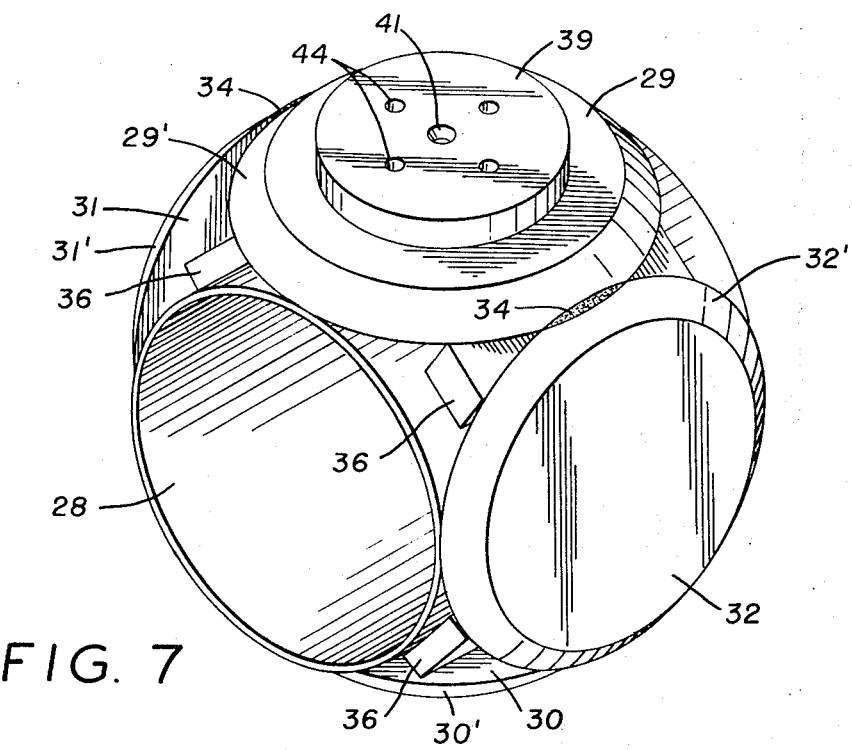
FIG. 7 is a perspective view thereof.

As shown in FIG. 1, the inner edges of the adjoining plates are preferably welded together under the weldments 34, and reinforcing plates 36 extend across the four corners between the plates 29, 30, 31 and 32 in lengthwise tangential abutment with the tube 28. The plates 36 have weldments 37 connecting their side edges throughout their lengths to the inner surfaces of the adjoining outer plates. As shown in FIG. 4, the reinforcing plates 36 have lengths terminating short of the ends of tube 28 and substantially where their side edges intersect the outer edges of the outer plates.

The upper and lower trunnion plates 29 and 30 have large cylindrical bosses forming trunnions 39 and 40, respectively, thereon. These bosses are preferably integral with the respective plates in order to provide optimum resistance to stresses to which the plates are subjected. The trunnions 39 and 40 are preferably substantially equal in thickness to the surrounding parts of the trunnion plates 29 and 30, respectively, and the diameters of the trunnions are of the order of three-fourths the diameters of the outer faces of the respective trunnion plates. While the diameters of the trunnions may vary somewhat, they should be at least one-half that of the outer faces of the trunnion plates in order to impart requisite strength.

The trunnions 39 and 40 preferably have centering holes 41 and 42, respectively, for chucking the valve element while forming the spherical surfaces on the plates, and trunnion 39 has four dowel holes 44 for attachment to the bottom flange 45 on valve stem 46 by the dowels 47 therein, as seen in FIG. 1. Preferably, a mounting plate 48 is spaced above the upper trunnion bearing 14 by a collar 49 surrounding the stem which is welded to bearing 14 and to the mounting plate. A tubular bushing 50 extends through the trunnion and plate and fits around the stem, and suitable bearing gaskets 52 and 53 are interposed between the surfaces of trunnion 29 and the trunnion bearing 14. Similar bearing gaskets 55 and 56 are provided between the bottom trunnion 40 and the bottom trunnion bearing 15.

Preferably, the valve stem has an axial bore 58 therethrough for enclosing an adjusting bolt 59 threaded through the lower end of the bore and abutting a plug 60 which wedgingly abuts the upper beveled portion of centering hole 41 in the upper trunnion plate 29. A screw plug 61 normally closes the upper end of the bore 58. The bolt 59 may be used to adjust the vertical pressure between the stem flange 45 and the housing socket 13 to regulate the turning friction on the valve element.

In assembling the novel rotary valve element shown in FIGS. 4 – 7, within the valve body 10 shown in FIGS. 1 – 3, the valve stem 46 is mounted on trunnion plate 29 and the bushing 50 fitted thereon. The gaskets 52 and 53 are then fitted around trunnion 39, and gaskets 55 and 56 fitted around trunnion 40, and the trunnion bearings 14 and 15 placed thereover. The mating halves 10a and 10b of the body 10 are next brought together around the valve element in the closed position of FIG. 1, with their edges in abutment where the weldment 11 is to be made. With the parts suitably held in abutment, the longitudinal weldments 11 and the circular weldments 12 and 13 between the body and the trunnion bearings 14 and 15 are made.

Next the flow tubes 17 with the seating rings positioned therein are moved into the end openings in the body 10 until the inner end surfaces of the rings yieldingly abut and conform to the spherical surfaces, and the circular weldments 16 between the flow tubes and the ends of the body 10 are then made.

Figure 8:
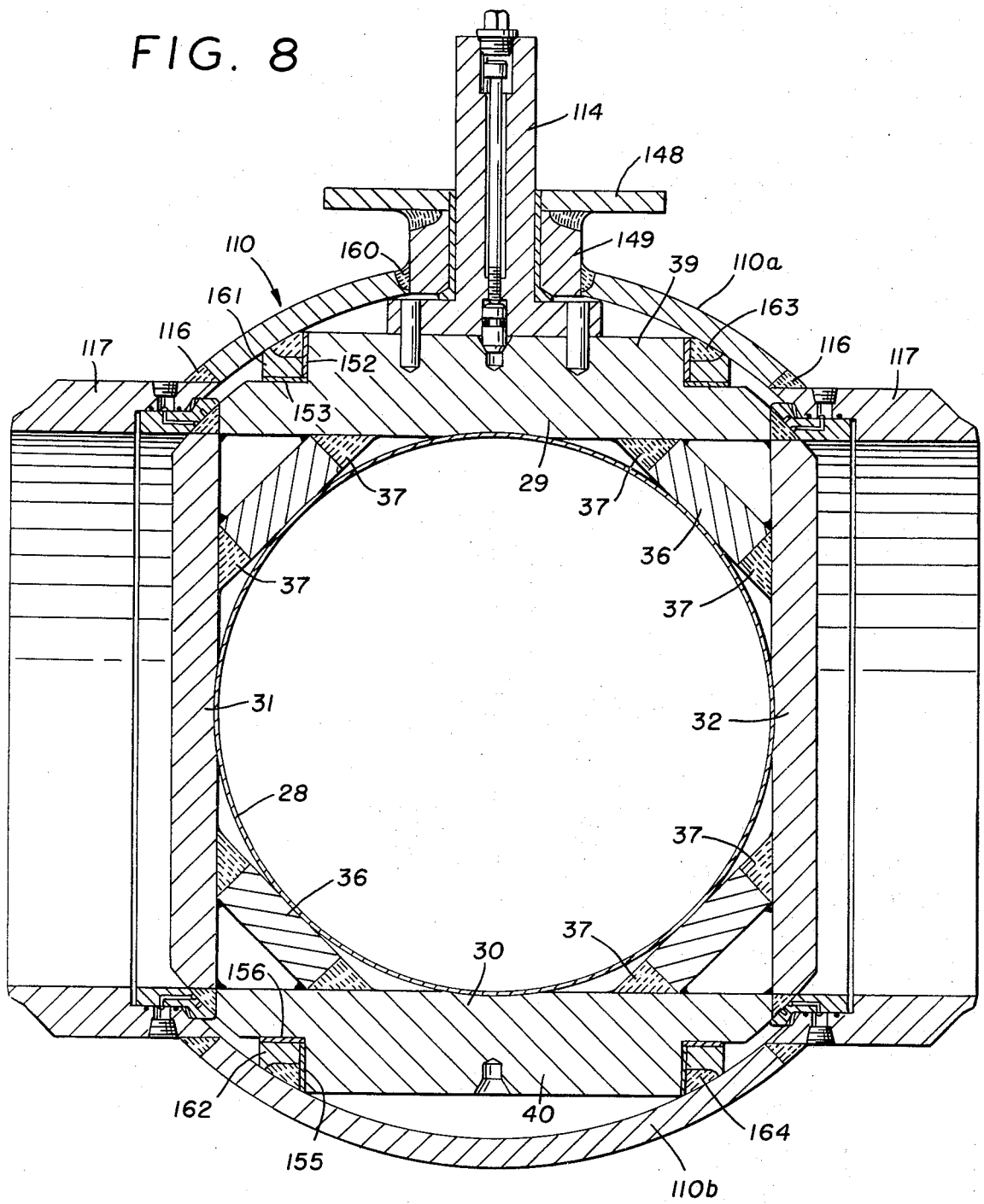
FIG. 8 is a view similar to FIG. 3, showing another embodiment of valve housing.

In the embodiment of valve housing 110 shown in FIG. 8, the novel valve element would be assembled in a similar manner. In this housing the spherical halves 110a and 110b are welded together in a horizontal plane passing through the flow axis at right angles to the stem axis. The flow tubes 117 are connected to opposite ends of the housing 110 by circular welds 116. The valve stem 114 extends through a collar 149 which is welded in the upper housing half 110a by a circular weld 160, and is also welded to mounting plate 148.

Before assembly, upper and lower trunnion bearing rings 161 and 162 are welded to the interior surfaces of housing halves 110a and 110b, respectively, by circular welds 163 and 164, respectively. After the bearing gaskets 152 and 153 are applied to the top trunnion 29, and the gaskets 155 and 156 are applied to the bottom trunnion, the housing parts 110a and 110b are brought together around the valve element with the bearing rings 161 and 162 fitted over the trunnions 39 and 40. The welds 160 and 116 are then made.

In the closed position of the valve element, when line pressure is applied to one of the sealing plates 31 or 32, the inward bowing effect on the sealing plate is resisted mainly by the two reinforcing plates 36 which extend across and are welded to the sealing plate at longitudinal zones substantially inward of the plate outer edges and substantially midway of the outer edges of the sealing plate and its center. The opposite edges of the reinforcing plates are welded at 37 to the trunnion plates at longitudinal zones substantially inward of the outer edges of the trunnion plates and under the trunnions 39 and 40.

The result of this improved valve element construction is that the stress transmitted through the reinforcing plates and the outward bowing effect on the trunnion plates is resisted by the combined thickness of the trunnion plate and the trunnion boss thereon, which is much stronger than a thicker plate with a smaller trunnion boss such as shown in my U.S. Pat. No. 3,323,537. In addition, the trunnion bearings 14 and 15 are held connected to the body by the circular weldments 12 and 13, so that the bearing plates 14 and 15, being joined to the welded body, increase the resistance to the outward bowing effect on the trunnion plates 29 and 30. In the construction of U.S. Pat. No. 3,323,537 the small diameter trunnions at the center of the trunnion plates offers very little resistance to the bowing of the plates due to the substantial plate area outside of the trunnions.

A scale model of the improved valve element as shown and described herein was tested by applying a pressure to one of the sealing plates in a vertical direction axially of the element. Since these valves when used in high pressure pipelines are required to resist a standard pressure of 1,440 p.s.i. according to the A.S.A. No. 600 standard, a total load of 101,000 pounds representing 1,440 p.s.i. was applied and the vertical deflection of the tube 28 during and after load was measured. The deflection under load measured at the top of the tube 28 was 0.012 inch and after the load was removed the deflection was zero.

The total load was then increased to 130,000 pounds representing about 1,650 p.s.i. and the deflection under load measured 0.016 inch and after the load was removed the deflection was zero, showing that the elastic limit of the steel structure was not reached.

The deflection of the tube 28 in a horizontal direction under the vertical load of 101,000 pounds measured at one side was 0.011 inch, and under the vertical load of 130,000 pounds measured 0.012 inch. In both cases the deflection was zero when the load was removed.

Accordingly, the improved construction provides a novel valve element of maximum strength and minimum weight which is economical to fabricate as compared with forged or cast rotary or ball valves required to have a substantially solid structure except for the flow tube.

I claim:

1. A rotary valve having a body including diametrically opposed trunnion bearings on the rotary axis and flow tubes at right angles to said axis, a rotary valve element having a central flow tube, diametrically opposed sealing plates and diametrically opposed plates having trunnions rectangularly arranged around said central flow tube in tangential relation therewith, said trunnions journaled in said trunnion bearings, the outer peripheries of said sealing plates and trunnion plates being joined together and spherically formed about the center of said central tube, and reinforcing plates extending lengthwise tangentially of said tube and across the corners between said sealing and trunnion plates with the side edges of the reinforcing plates joined to said sealing and trunnion plates, said trunnions having an axial thickness substantially equal to that of the trunnion plates and a diameter at least one-half of the diameter of the trunnion plates.

2. A rotary valve as in claim 1, in which the reinforcing plates are welded to the trunnion plates along longitudinal zones underlying said trunnions.

3. A rotary valve element for a rotary valve, comprising a central flow tube, diametrically opposed sealing plates and diametrically opposed trunnion plates rectangularly arranged around said tube in tangential relation therewith, said plates joined together at their outer peripheries and having their joined outer peripheries spherically formed about the center of said tube, and reinforcing plates extending lengthwise tangentially of said tube and across the corners between said sealing and trunnion plates with the side edges of the reinforcing plates joined to said plates, said trunnion plates having exterior trunnions thereon, and said trunnions having an axial thickness substantially equal to that of the trunnion plates and a diameter at least one-half of the diameter of the trunnion plates measured between the sealing plates.

4. A rotary valve element as in claim 3, in which the reinforcing plates are welded to the trunnion plates along longitudinal zones underlying said trunnions.

5. A rotary valve element as in claim 3, in which the trunnions have an axial thickness substantially equal to that of the trunnion plates and a diameter of about three-fourths of the diameter of the outer faces of the trunnion plates.

6. A rotary valve element as in claim 4, in which the trunnions have an axial thickness substantially equal to that of the trunnion plates and a diameter of about three-fourths of the diameter of the outer faces of the trunnion plates.

* * * * *